United States Patent [19]

Evans

[11] Patent Number: 4,960,811

[45] Date of Patent: Oct. 2, 1990

[54] FLUOROSILICONE COMPOSITIONS WITH IMPROVED ELASTIC RESPONSE

[75] Inventor: Edwin R. Evans, Clifton Park, N.Y.

[73] Assignee: General Electric Company, Waterford, N.Y.

[21] Appl. No.: 367,402

[22] Filed: Jun. 16, 1989

[51] Int. Cl.$^5$ ............................................. C08K 5/24
[52] U.S. Cl. .................... 524/265; 524/188; 524/266; 524/431; 524/767; 524/768; 525/477; 528/15; 528/14; 528/19; 528/37; 528/42
[58] Field of Search .......... 528/42, 37, 14, 15, 528/19; 525/477; 524/431, 265, 266, 767, 768, 188

[56] References Cited

U.S. PATENT DOCUMENTS

| | | | |
|---|---|---|---|
| 3,635,743 | 1/1972 | Smith | 106/288 |
| 3,847,848 | 11/1974 | Evans et al. | 524/860 |
| 4,029,629 | 6/1977 | Jeram | 260/37 |
| 4,041,010 | 8/1977 | Jeram | 260/42 |
| 4,157,337 | 6/1979 | Evans | 260/448 |
| 4,529,774 | 7/1985 | Beers | 260/18 |
| 4,585,848 | 4/1986 | Evans et al. | 528/15 |
| 4,599,374 | 7/1986 | Bluestein | 523/213 |
| 4,724,167 | 2/1988 | Evans et al. | 427/221 |

OTHER PUBLICATIONS

"New High-Performance Fluorisilicone Rubbers", M. Fukushima, K. Itoh, T. Fukuda, Oct. 6, 1987.

Primary Examiner—Melvyn I. Marquis

[57] ABSTRACT

Fluorosilicone heat cured rubber compositions are prepared using a chain modifier mixture comprising vinyl terminated polysiloxanes and silanol terminated siloxanes which allow vinyl-on-chain-ends functionality to easily crosslink unhindered by perfluoroalkyl groups.

14 Claims, No Drawings

FLUOROSILICONE COMPOSITIONS WITH IMPROVED ELASTIC RESPONSE

This invention ralates to fluorosilicone rubber compositions which incorporate vinyl-on-chain-end functionality through the use of chain modifiers that reduce or eliminate steric hinderance from perfluoroalkyl groups.

BACKGROUND OF THE INVENTION

Flourosilicone heat cured rubber compositions of the general purpose type are found to provide good processability and improved resistance to vapor and liquid permeability for various solvents. However, fluorosilicones have at best only an adequate physical property profile. That is, these heat cured rubber compositions possess good elongation and hardness but are deficient in other physical properties such as compression set, tensile, and resilience. These deficiencies are partially the result of the type of reactive groups in the components of the flourosilicone rubber compositions which are usually silanol functional. These compositions are usually extended with additional fillers, process aids or other agents to reduce either the out-of-pocket costs or to optimize a particular property.

Vinyl functional groups may be used that will provide a higher state of cure (degree of cross-linking as measured by Monsanto Rheometer) that yields better compression and tensile. However, these improvements are at the cost of lower elongation and resilience. The reason for this problem stems from the bulkiness of the perfluoroalkyl groups in the fluorosilicone compositions. In order to overcome steric hinderence, the use of a high weight percent vinyl is required in order to achieve reasonable reaction rates. This high percentage of vinyl, however, causes a high degree of crosslinking and a worsening of the physical properties noted above.

It has been discovered that new fluorosilicone high molecular weight (HMW) polymers having vinyl groups that are distributed randomly along the chain, as well as on some of the chain ends, 10 provide a high state-of-cure even though the total net amount of vinyl unsaturation is lower than in current polymers. The utilization of these new HMW polymers in conjunction with treated fumed silica yields polymer compounds with superior processability including lower tackiness, higher extrusion rate, better physical appearance, etc., and improved elastic response when cured.

The ability to obtain a high state of cure with lower vinyl concentration is achieved by the use of chain modifiers that eliminate or reduce steric hinderance on the chain ends from the bulky perfluoroalkyl groups. This reduction in steric hinderance on the chain ends allows vinyl-on-chain-end to crosslink easier. This reduction in steric hinderance also means less vinyl-on-chain is needed to achieve the same state of final cure which translates to less overall vinyl unsaturation.

Thus, it is an object of this invention to provide novel fluorosilicone rubber compositions which incorporate chain modifiers to reduce steric hinderance on chain ends tò facilitate crosslinking.

It is also an object of this invention to provide a novel process for manufacturing fluorosilicone rubber compositions which incorporate chain modifiers to reduce steric hinderance on chain ends.

SUMMARY OF THE INVENTION

Briefly, according to the present invention there is provided a fluorosilicone rubber composition comprising:
(A) 100 parts by weight of the reaction (addition) product of:
(1) 100 parts by weight of a fluorosilicone cyclic trimer;
(2) from about 0.5 to about 2.0 parts by weight of a chain modifier mixture comprising:
(a) from 20% to 96% by weight vinyl terminated

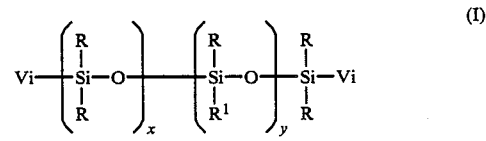

and
(b) from 4% to 80% by weight siloxanes of the formula:

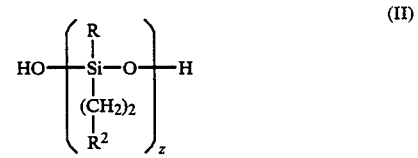

wherein Vi is vinyl, R is selected from the class consisting of substituted or unsubstituted $C_{1-4}$ alkyl and phenyl radicals; $R^1$ is R or $-CH_2CHR^2$; $R^2$ is perfluoroalkyl of from 1 to 4 carbon atoms; $x=30$ to 45; $y=15$ to 30; and $z=3$ to 6;
(3) from about 0.045 to about 0.065 parts by weight 1,3,5-trimethyl-1,3,5-trivinylsiloxane cyclic trimer; and
(4) sufficient sodium fluorosilanolate to provide 10 ppm of NaOH; and
(B) from about 1 to about 10 parts by weight of polydimethylsiloxane gum having approximately 3.2 weight percent vinyl groups;

Also, according to the present invention there is provided a process for manufacturing a flourosilicone rubber composition comprising:
(A) Adding to a reactor a composition comprising:
100 parts by weight of a fluorosilicone cyclic trimer;
(2) from about 0.5 to about 2.0 parts by weight of a chain modifier mixture per 100 parts by weight component (A)(1) comprising:
(a) from 20% to 96% by weight vinyl terminated polysiloxanes of the formula:

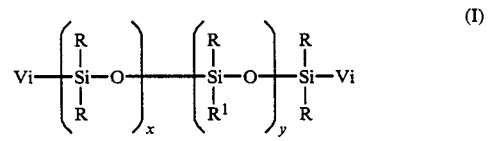

and
(b) from 4% to 80% by weight siloxanes of the formula:

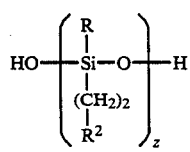

wherein Vi is vinyl, R is selected from the class consisting of substituted or unsubstituted $C_{1-4}$ alkyl and phenyl radicals, $R^1$ is R or $-CH_2CHR^2$, $R^2$ is perfluoroalkyl of from 1 to 4 carbon atoms, $x=30$ to 45, $y=15$ to 30, and $z=3$ to 6;

(3) from about 0.045 to about 0.065 parts by weight 1,3,5-trimethyl-1,3,5-trivinylsiloxane cyclic trimer; and (4) sufficient sodium flourosilanolate to provide 10 ppm of NaOH; and (B) Heating the composition of part (A) to approximately 118-135° C. to initiate the reaction;

(C) Mixing into the base polymer, the polymer of step A, from about 1 to about 10 parts by weight of polydimethylsiloxane gum having 3.2 weight percent vinyl groups.

DETAILED DESCRIPTION OF THE INVENTION

According to the present invention there is provided a flourosilicone rubber composition comprising:

(A) 100 parts by weight of the reaction (addition) product of:

(1) 100 parts by weight of a fluorosilicone cyclic trimer;

(2) from about 0.5 to about 2.0 parts by weight of a chain modifier mixture comprising:
 (a) from 20% to 96% by weight vinyl terminated polysiloxanes of the formula:

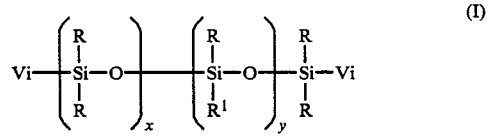

and
 (b) from 4% to 80% by weight siloxanes of the formula:

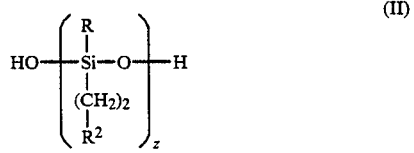

wherein Vi is vinyl, R is selected from the class consisting of substituted or unsubstituted $C_{1-4}$ alkyl and phenyl radicals, $R^1$ is R or $-CH_2CHR^2$, $R^2$ is perfluoroalkyl of from 1 to 4 carbon atoms, $x=30$ to 45, $y=15$ to 30, and $z=3$ to 6;

(3) from about 0.045 to about 0.065 parts by weight 1,3,5-trimethyl-1,3,5-trivinylsiloxane cyclic trimer; and (4) sufficient sodium flourosilanolate to provide 10 ppm of NaOH; and (B) from about 1 to about 10 parts by weight of polydimethylsiloxane gum having 3.2 weight percent vinyl groups;

This new HMW gum is designed to have some of the chain ends terminated with vinyl groups and also have the vinyl-on-chain-ends removed from the segmented symmetry and steric control of the bulky perfluoroalkyl groups via a random mixture of $R_2SiO$— and $R_2(CH_2)_2RSiO$—groups. The HMW gum has the general formula:

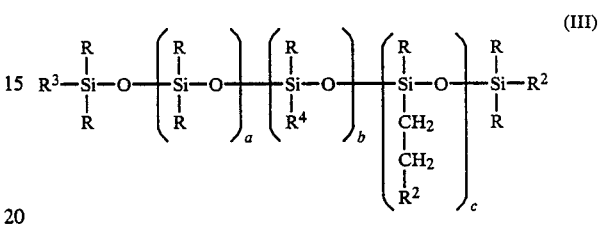

wherein R is previously defined; $R^2$ is perfluoroalkyl of from 1 to carbon atoms; $R^3$ is $C_{1-4}$ alkenyl or $C_{1-4}$ hydroxy functional; $R^4$ is R, $C_{1-4}$ alkenyl, or $C_{1-4}$ difluoroallyl; $a=15-23$, $b=7-15$, and $c$ greater than or equal to 1000. Preferably, $R^3$ is vinyl or HO—; R is methyl; $R^2$ is $CF_3$; $R^4$ is methyl or vinyl; $a=17-21$; $b=10.5-12.5$; and $c \geq 1000$.

The number of vinyl chain ends may vary over the range of 40-90% or more, preferably 60-80%, which provides a vinyl-on-chainends concentration over the range of 0.006 to 0.02 weight percent or more preferably 0.008 to 0.015 weight percent. The balance of the chain ends being $C_{1-4}$ hydroxy functional. However, SiOH is preferred since it facilitates polymer-filler interaction.

Backbone unsaturation arises primarily through the use of the $D_3^{Vi}$ cyclic trimer. Although not preferred, $D_4^{Vi}$ may be substituted for the trimer. The vinyl-on-chain may vary over the range of 0.02 to 0.06 weight percent or more preferrably 0.04 to 0.05 weight percent. Additional unsaturation arises because the fluorosilicone cyclic trimer has been found to contain the fluoroallyl group, $-CH_2CH=CF_2$. This is taught by Evans et al. in U.S. Pat. No. 4,585,848, hereby incorporated by reference. The amount of the difluoroallyl on chain may vary from 0.01 to 1.0 weight percent.

The fluorosilicone cyclic trimer, component A(1), is well known to those skilled in the art. Preferably, methyl-3,3,3trifluoropropylsiloxane cyclic trimer is used.

Each of the components of the chain modifier mixture, A(2), is also known in the art. There is from about 0.5 to about 2.0 parts by weight of the chain modifier mixture per 100 parts by weight of component A(1). Preferably, there is from about 0.8 to about 1.6 parts by weight of the chain modifier mixture per 100 parts by weight of component A(1). More preferably, there is from about 1.1 to about 1.3 parts by weight of the chain modifier mixture per 100 parts by weight of component A(1).

In addition, the chain modifier mixture is preferably from about 90% to about 95% by weight vinyl terminated polysiloxane, component A(2a), and from about 5% to about 10% silanol terminated siloxane, component A(2b). Further, the silanol terminated siloxane, component A(2b), has a degree of polymerization of from 3 to 6. However, 3 is preferred as this increases the weight percent of -OH functionality, thus making it more effective.

The 1,3,5-trimethyl-1,3,5-trivinylsiloxane cyclic trimer, component A(3), is well known to those skilled in the art and is present in an amount of from about 0.045 to about 0.065 parts by weight per 100 parts of component A(1). Preferably, component A(3) is present in an amount of from about 0.05 to about 0.055 parts per parts of component A(1). Although not preferable, a $D_4^{Vi}$ cyclic tetramer may be used as substitute for the $D_3^{Vi}$ trimer.

The sodium fluorosilanolate catalyst effective for producing fluorosilicone polymers and is preferably comprised of the formula:

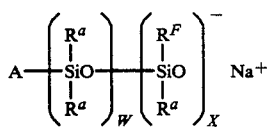

wherein W is 0 to 50; X is from 3 to 50; A is —OH, a $C_{1-8}$ alkenyl such as vinyl, a $C_{1-8}$ alkyl such as methyl, a $C_{1-8}$ aryl such as phenyl, a $C_{1-8}$ halosubstituted alkyl such as 3,3,3-triflouropropyl, a $C_{1-8}$ alkoxy such as octyloxy, or —O$^-$Na$^+$; Ra is a substituted or unsubstituted $C_{1-8}$ hydrocarbon radical; and $R^F$ is a $C_{1-8}$ fluroine substituted alkyl.

The polydimethylsiloxane gum, component B, is also well known to those skilled in the art. There is from about 1 to about 10 parts by weight of polydimethylsiloxane gum having about 3.2 weight percent vinyl groups per 100 parts by weight component A(1). Preferably there is from about 3 to about 7 parts by weight of polydimethylsiloxane gum having about 3.2 weight percent vinyl groups per 100 parts by weight component A(1). The purpose of the gum is to aid in the cross-linking through the vinyl groups. Those skilled in the art will readily understand that the weight percent vinyl is inversely proportional to the amount of gum necessary. That is, if the weight percent vinyl is increased in the gum then less gum will be needed to effect cross-linking.

Optionally, to the fluorosilicone rubber composition there may be added plasticizers, fillers, and heat age additives in order to impart necessary physical properties.

There may be added to the fluorosilicone rubber composition a plasticizer from about 3 to about 10 parts by weight per 100 parts of component A(1). Alkoxy terminated polydimethylsiloxane has been found to be particularly useful in this respect. Preferably, there is from about 4 to about 7 parts alkoxy terminated polydimethyl siloxane per 100 parts of component A(1). Also useful is silanol terminated polydimethylsiloxane, but it is not the preferred plasticizer since the physical properties of the resultant silicone rubber are not as good as with alkoxy terminated plasticizers.

To increase the tensile strength and toughness of the final cured fluorosilicone rubber, it is preferred to incorporate into it a reinforcing filler. It has been found that fumed silica and precipitated silica are the best fillers for the present composition in terms of optimizing the cured composition's tensile strength and toughness. More preferably, fumed silica is used in an amount of from about 10 to about 200 parts by weight per 100 parts component A(1). Still more preferably, the amount of fumed silica is present in an amount of from about 15 to about 60 parts by weight per 100 parts component A(1). Most preferably, the amount of fumed silica is present in an amount of from about 23 to about 27 parts by weight per 100 parts component A(1).

Pretreated fumed silica may be utilized in accordance with the disclosure of Evans et al., Smith, U.S. Pat. No. 4,529,774; Smith, U.S. Pat. No. 3,635,743; and Beers, U.S. Pat. No. 3,847,848; hereby incorporated by reference. However, it is preferable to treat the fumed silica in-situ; that is add the untreated silica and the individual treating agents to the fluorosilicone rubber composition separately and allow the treatment to take place while the filler is mixed into the rubber composition. This may be done in accordance with Evans, U.S. Pat. No. 4,529,774.

Thus, to the fluorosilicone rubber composition may be added untreated fumed silica filler in an amount of from about 10 to about 200 parts by weight per 100 parts component A(1). More preferably, the amount of fumed silica is present in an amount of from about 15 to about 60 parts by weight per 100 parts component A(1). Most preferably, the amount of fumed silica is present in an amount of from about 23 to about 27 parts by weight per 100 parts component A(1).

Along with the untreated fumed silica is added from about 0.02 to about 1.0 parts by weight vinyl silazane per 100 parts component A(1). Preferably, there is added 0.08 to about 0.3 parts by weight vinyl silazane per 100 parts component A(1).

In addition, there is added from about 14 to about 25 parts by weight fluorosilicone telomeric siloxanol fluid having up to 7 weight percent silanol, per 100 parts component A(1). Preferably, there is from about 17 to about 20 parts by weight fluorosilicone telomeric siloxanol fluid having 6 weight percent silanol per 100 parts component A(1). One skilled in the art will readily understand that there is an inverse relationship between the weight percent silanol functionality and the amount of telomeric siloxanol fluid necessary for treatment. Thus, if the weight percent silanol functionality is increased, there should be a corresponding decrease in the total amount of fluid added.

In addition, it has been found that heat age additives impart thermal resistance to the final cured product. Thus, is is contemplated that heat age additives are included in the fluorosilicone rubber composition. These additives may be a mixture of iron octoate and TiO2 with the amount of iron octoate being from about 0.01 to about 0.1 parts per 100 parts component A(1) and the amount of TiO$_2$ being from about 0.3 to about 2.0 parts per 100 parts component A(1). The preferred ratio of iron octoate to TiO$_2$ is 10:1.

The preferred heat age additive, however, is rare earth octoate in an amount of from about 0.25 to about 2.0 parts per 100 parts component A(1). Preferably, there is from about 0.35 to about 0.6 parts rare earth octoate per 100 parts component A(1).

The chain modifier mixture (part A(2)) may optionally be substituted with siloxanes of the general formula:

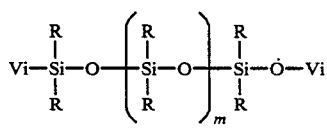

(IV)

wherein Vi is vinyl, R is described above, and m 16–22. Preferably, R is methyl and m=18–20.

However, the chain modifier mixture A(2) is preferable since it is more compatible and yields clear gums. Gums prepared with the siloxane of formula IV vary from translucent to opaque depending upon the desired molecular weight. The lower the molecular weight the greater the tendency towards opaqueness.

The process of manufacturing the HMW gum comprises the steps of:

(A) Adding to a reactor a composition comprising:
 (1) 100 parts by weight of a fluorosilicone cyclic trimer;
 (2) from about 0.5 to about 2.0 parts by weight of a chain modifier mixture per 100 parts by weight component (A)(1) comprising:
  (a) from 20% to 96% by weight vinyl terminated polysiloxanes of the formula:

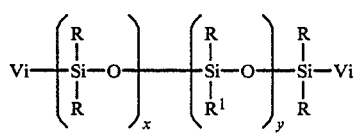

(I)

and
  (b) from 4% to 80% by weight siloxanes of the formula:

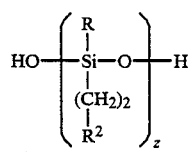

(II)

wherein Vi is vinyl, R is selected from the class consisting of $C_{1-4}$ alkyl and phenyl radicals, $R^1$ is R or $-(CH2)2-R^2$. $R^2$ is perfluoroalkyl of from 1 to 4 carbon atoms, x=30 to 45, y=15 to 30, and z=3 to 6;
 (3) from about 0.045 to about 0.065 parts by weight 1,3,5-trimethyl-1,3,5-trivinylsiloxane cyclic trimer; and
 (4) sufficient sodium flourosilanolate to provide 10 ppm of NaOH; and (B) Heating the composition of part (A) to approximately 118–135° C. to initiate the reaction;

(C) Mixing into the base polymer, the polymer of step A, from about 1 to about 10 parts by weight of polydimethylsiloxane gum having 3.2 weight percent vinyl groups.

In addition, in order to tailor the physical properties of the fluorosilicone gum, it is preferable to admix plasticizers, reinforcing fillers, and heat age additives into the gum. The amounts of each additive are as described above herein. The procedure to follow is to add each ingredient to the base polymer at the same time the polydimethylsiloxane is admixed to the base polymer, step C.

The following examples, which demonstrate the invention, are intended for instructional purposes and are not to be construed as limitations on the invention.

EXAMPLES 1–4

The base polymer for Examples 1–4 was prepared in the following manner. To 393 grams of dried methyl-3,3,3-triflouropropylsiloxane cyclic trimer is added 5.06 grams of the preferred chain modifier mixture, 0.73 grams of 1,3,5 -trimethyl- 1,3,5 -trivinylsiloxane cyclic trimer and sufficient vinyl terminated sodium flourosilanolate (4.3% NaOH equivalent) to provide 10 ppm NaOH. The polymerization is initiated while at 118–135° C. and under a blanket of nitrogen. The reaction time was 4.5–5.0 hours and was terminated by addition of silyl phosphate (equivalent to 11% $H_3PO_4$). The reaction yielded 398 grams of gum having volatiles of 0.74 weight percent and a Williams Plasticity (3 minute reading) of 224. The total vinyl content then determined by FTIR.

To the base polymer were then added the fillers and process aids listed in Table 1, which follows.

TABLE

| Flourosilicone Formulations (amounts are in parts) | | | | |
|---|---|---|---|---|
|  | Example 1 | Example 2 | Example 3 | Example 4 |
| Base Polymer -Vinyl Content | 100 (0.084%) | 100 (0.084%) | 100 (0.084%) | 100 (0.050%) |
| Fumed Silica | 23 | 23 | 23 | 23 |
| Process Aid | 3 | 0 | 0 | 0 |
| FS Siloxanol | 0 | 4.8 | 4.8 | 4.8 |
| High Vinyl PDMS | 5 | 5 | 5 | 5 |
| Vinyl Silazane | 0 | 0.13 | 0 | 0.13 |
| Rare Earth Octoate | 0.45 | 0.45 | 0.45 | 0.45 |
| In-situ Treated | No | Yes | Yes | Yes |

Table II, which follows, summarizes the physical testing done on each of the samples.

TABLE II

| Physical Test Results | | | | |
|---|---|---|---|---|
|  | Example 1 | Example 2 | Example 3 | Example 4 |
| Shore A | 44 | 39 | 44 | 40 |
| 100% Modulus (psi) | 155 | 195 | 175 | 175 |
| Tensile (psi) | 880 | 1025 | 1380 | 1290 |
| Elongation (%) | 385 | 330 | 305 | 380 |
| SPG | 1.365 | 1.385 | 1.389 | 1.383 |
| Die B Tear (pi) | 70 | 80 | 82 | 110 |
| Bayshore (%) | — | 23 | 25 | 31 |
| Compression Set (22 hr/ 177° C., %) | 31 | 20 | 28.3 | 12 |

Table III, which follows, summarizes testing which demonstrates the state of cure or cross-link density.

TABLE III

| Monsanto Rheometer (3° Arc, 177° C.) | | | | |
|---|---|---|---|---|
|  | Example 1 | Example 2 | Example 3 | Example 4 |
| Initial viscosity (inch pounds of torque) | 4.2 | 5.0 | 4.8 | 5.7 |

TABLE III-continued

| | Monsanto Rheometer (3° Arc, 177° C.) | | | |
|---|---|---|---|---|
| | Example 1 | Example 2 | Example 3 | Example 4 |
| Cure rate (inch pounds/minute) | 6.5 | 6.7 | 6.5 | 9.5 |
| State of cure (inch pounds) | 27.0 | 29.0 | 28.0 | 33.5 |
| Scorch (minutes) | 1.0 | 1.0 | 1.0 | 1.0 |

What is claimed is:

1. A fluorosilicone rubber composition comprising:
    (A) 100 parts by weight of the reaction product of:
        (1) 100 parts by weight of a fluorosilicone cyclic trimer;
        (2) from about 0.5 to about 2.0 parts by weight of a chain modifier mixture comprising:
            (a) from 20% to 96% by weight vinyl terminated polysiloxanes of the formula:

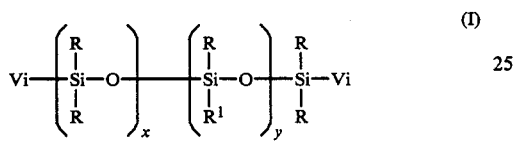

and
            (b) from 4% to 80% by weight siloxanes of the formula:

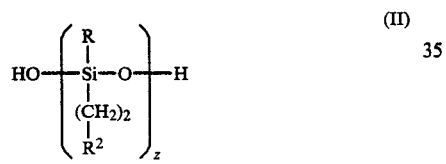

wherein Vi is vinyl, R is selected from the class consisting of $C_{1-4}$ alkyl and phenyl radicals; $R^1$ is R or $-(CH_2)_2-R^2$; $R^2$ is perfluoroalkyl of from 1 to 4 carbon atoms; $x=30$ to 45; $y=15$ to 30; and $z=3$ to 6;
        (3) from about 0.045 to about 0.065 parts by weight 1,3,5-trimethyl-b 1,3,5-trivinylsiloxane cyclic trimer; and
        (4) sufficient sodium fluorosilanolate to provide 10 ppm of NaOH; and
    (B) from about 1 to about 10 parts by weight of polydimethylsiloxane gum having approximately 3.2 weight percent vinyl groups.

2. The fluorosilicone rubber composition of claim 1 wherein the fluorosilicone cyclic trimer is methyl-3,3,3-trifluoropropylsiloxane cyclic trimer.

3. The fluorosilicone rubber composition of claim 1 wherein there is further added from about 3 to about 10 parts plasticizer per 100 parts component A(1).

4. The fluorosilicone rubber composition of claim 3 wherein the plasticizer is alkoxy terminated polydimethylsiloxane.

5. The fluorosilicone rubber composition of claim 4 wherein there is further added a mixture comprising:
    a. from about 10 to about 200 parts by weight fumed silica;
    b. from about 0.02 to about 1.0 parts by weight vinyl silazane; and
    c. from about 14 to about 25 parts by weight fluorosilicone telomeric siloxanol fluid.

6. The fluorosilicone rubber composition of claim 5 wherein there is further added from about 0.25 to about 2.0 parts rare earth octoate.

7. The fluorosilicone rubber composition of claim 5 wherein there is further added a mixture comprising:
    a. from about 0.01 to about 0.1 parts iron octoate and
    b. from about 0.3 to about 2.0 parts $TiO_2$.

8. A process of manufacturing fluorosilicone rubber compositions comprising:
    (A) Adding to a reactor a base polymer composition comprising:
        (1) 100 parts by weight of a fluorosilicone cyclic trimer;
        (2) from about 0.5 to about 2.0 parts by weight of a chain modifier mixture per 100 parts by weight component (A)(1) from about 0.5 to about 2.0 parts by weight of a chain modifier mixture per 100 parts by weight component (A)(1) comprising:
            (a) from 20% to 96% by weight vinyl terminated polysiloxanes of the formula:

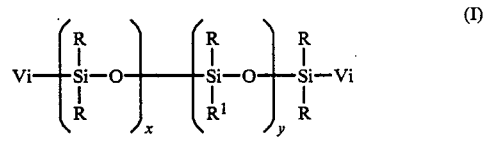

and
            (b) from 4% to 80% by weight siloxanes of the formula:

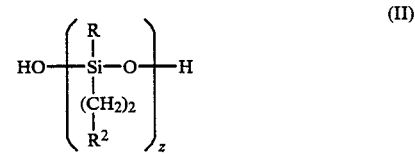

wherein Vi is vinyl, R is selected from the class consisting of $C_{1-4}$ alkyl and phenyl radicals; $R^1$ is R or $-(CH_2)_2-R^2$, $R^2$ is perfluoroalkyl of from 1 to 4 carbon atoms, $x=30$ to 45, $y=15$ to 30, and $z=3$ to 6;
        (3) from about 0.045 to about 0.065 parts by weight 1,3,5-trimethyl-1,3,5-trivinylsiloxane cyclic trimer; and
        (4) sufficient sodium fluorosilanolate to provide 10 ppm of NaOH; and
    (B) Heating the base polymer composition of part (A) to approximately 118–135° C. to initiate the reaction;
    (C) Mixing into the base polymer, the polymer of step A, from about 1 to about 10 parts by weight of polydimethylsiloxane gum having 3.2 weight percent vinyl groups.

9. The process of claim 8 wherein the fluorosilicone cyclic trimer is methyl-3,3,3-trifluoropropyl cyclic trimer.

10. The process of claim 8 wherein there is further mixed into the fluorosilicone rubber composition a plasticizer from about 3 to about 10 parts per 100 parts component (A(1).

11. The process of claim 10 wherein the plasticizer is alkoxy terminated polydimethylsiloxane.

12. The process of claim 11 wherein there is further mixed into the fluorosilicone rubber composition a mixture comprising:
   a. from about 10 to about 200 parts by weight fumed silica;
   b. from about 0.02 to about 1.0 parts by weight vinyl silazane; and
   c. from about 14 to about 25 parts by weight fluorosilicone telomeric siloxanol fluid.

13. The process of claim 12 wherein there is further mixed into the fluorosilicone rubber composition from about 0.25 to about 2.0 parts rare earth octoate.

14. The process of claim 12 wherein there is further mixed into the fluorosilicone rubber composition a mixture comprising:
   a. from about 0.01 to about 0.1 parts iron octoate and
   b. from about 0.3 to about 2.0 parts $TiO_2$.

* * * * *